(12) United States Patent
Klemarczyk et al.

(10) Patent No.: US 6,897,277 B1
(45) Date of Patent: May 24, 2005

(54) CURE ACCELERATORS FOR ANAEROBIC CURABLE COMPOSITIONS

(75) Inventors: Philip T. Klemarczyk, Canton, CT (US); Karen R. Brantl, West Springfield, MA (US)

(73) Assignee: Henkel Corporation, Rocky Hill, CT (US)

( * ) Notice: Subject to any disclaimer, the term of this patent is extended or adjusted under 35 U.S.C. 154(b) by 21 days.

(21) Appl. No.: 10/740,669

(22) Filed: Dec. 22, 2003

(51) Int. Cl.$^7$ .................................................. C08F 2/00
(52) U.S. Cl. ..................... 526/215; 523/176; 526/217; 526/229; 526/230; 526/301; 526/302; 526/320
(58) Field of Search .................. 523/176; 156/310, 156/332, 331.1; 526/215, 217, 229, 301, 302, 279, 230, 319, 320, 321, 292.2, 326

(56) References Cited

U.S. PATENT DOCUMENTS

| | | | |
|---|---|---|---|
| 3,218,305 A | 11/1965 | Krieble | 260/89.5 |
| 4,180,640 A | 12/1979 | Melody et al. | 526/323.1 |
| 4,287,330 A | 9/1981 | Rich | 526/270 |
| 4,321,349 A | 3/1982 | Rich | 526/270 |
| 5,444,104 A * | 8/1995 | Waknine | 522/24 |
| 5,605,999 A | 2/1997 | Chu et al. | 528/24 |
| 5,756,650 A * | 5/1998 | Kawamonzen et al. | 528/353 |
| 6,495,298 B1 * | 12/2002 | Fujishiro et al. | 430/7 |
| 6,583,289 B1 | 6/2003 | McArdle et al. | 548/123 |

FOREIGN PATENT DOCUMENTS

WO        WO 99/64471        * 12/1999

OTHER PUBLICATIONS

Boerio, F. J. and Hong, P. P., *American Chemical Society*, "Surface–Enhanced Raman Scattering from Model Acrylic Systems", pp. 721–727 (1989).

Pizzi, A. and Mittal, K. L., *Handbook of Adhesive Technology*, "Anaerobic Adhesives", pp. 467–479 (1994).

* cited by examiner

*Primary Examiner*—Tatyana Zalukaeva
(74) *Attorney, Agent, or Firm*—Steven C. Bauman

(57) ABSTRACT

The present invention relates to phenyl glycines and derivatives thereof as cure accelerators for anaerobic curable compositions.

14 Claims, 3 Drawing Sheets

CURE ACCELERATORS FOR ANAEROBIC CURABLE COMPOSITIONS

BACKGROUND OF THE INVENTION

1. Field of the Invention

The present invention relates to phenylglycines and derivatives thereof as cure accelerators for anaerobic curable compositions.

2. Brief Description of Related Technology

Anaerobic adhesive compositions generally are well-known. See e.g., R. D. Rich, "Anaerobic Adhesives" in *Handbook of Adhesive Technology*, 29, 467–79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Desirable anaerobic cure-inducing compositions to induce and accelerate cure may include saccharin, toluidines, such as N,N-diethyl-p-toluidine ("DE-p-T") and N,N-dimethyl-o-toluidine ("DM-o-T"), acetyl phenylhydrazine ("APH"), maleic acid, and quinones, such as napthaquinone and anthraquinone. See e.g., Loctite U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Saccharin and APH have been used as standard cure accelerator components in anaerobic adhesive cure systems since the inception of the technology, and has been well studied in that connection. Hitherto, it was believed that the nitrogen-hydrogen bond off the heterocycle ring was nessecary to achieve performance under anaerobic conditions, as early studies substituting the hydrogen with an alkyl group proved to be ineffective. See F. J. Boerio et al., "Surface-Enhanced Raman Scattering from Model Acrylic Adhesive Systems", *Langmuir*, 6, 721–27 (1990), in which it is stated "[t]hese salts [of saccharin] are thought to be important factors in the curing reaction of the adhesive."

Recently, Loctite (R&D) Ltd. developed an anaerobic adhesive composition, which is defined by (a) a (meth) acrylate component; and (b) an anaerobic cure-inducing composition comprising an anaerobic curative within the following structure:

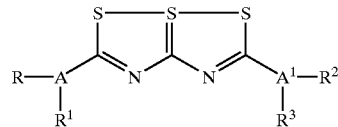

where A and $A^1$ may be selected from O and N; and

R, $R^1$, $R^2$ and $R^3$ may be the same or different and are selected from alkyl, alkenyl, cycloalkyl, cycloalkenyl, and aryl, having from 1 to about 30 carbon atoms, and may be substituted or interrupted with a heteroatom, and heterocyclic structures; or $R^1$ and $R^3$ taken together may join to form a cyclic structure having from about 20 to about 28 ring atoms, and together represent dialkyl substituted polyether structures that may be substituted or interrupted with the trithiadiaza pentalene structure, which itself may or may not be substituted by $A^1$, $R^2$, or $R^3$, as defined above. See U.S. Pat. No. 6,583,289 (McArdle).

There is an on-going desire to find alternative technologies for accelerating the cure of anaerobic curable compositions to differentiate existing products and provide supply assurances in the event of shortages or cessation of supply of raw materials. Accordingly, it would be desirable to identify new materials, which function as accelerators in the cure of anaerobic curable compositions.

SUMMARY OF THE INVENTION

The present invention provides new cure accelerators for anaerobic curable compositions. The anaerobic curable compositions are typically used as adhesives or sealants.

The anaerobic cure accelerators are generally phenyl glycines and derivatives thereof. For instance, the inventive cure accelerators may be within structure I

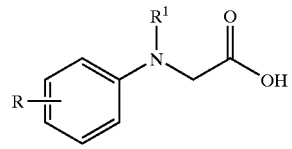

where R is hydrogen, halogen, alkyl, alkenyl, hydroxyalkyl, hydroxyalkenyl, carboxyl, or sulfonato, and $R^1$ is hydrogen, alkyl, alkenyl, hydroxyalkyl, hydroxyalkenyl, or aralkyl.

The addition of these materials into anaerobic curable compositions as a replacement for some or all of the amount of conventional anaerobic cure accelerators (such as o-benzoic sulfimide or saccharin, used interchangeably throughout) and/or aromatic amines (such as toluidines like diethyl-p-toluidine and dimethyl-o-toluidine) surprisingly provides at least comparable cure speeds and physical properties for the reaction products formed therefrom.

This invention also provides anaerobic curable compositions and anaerobic curable composition systems prepared with such cure accelerators, methods of preparing and using the inventive anaerobic curable compositions as well as reaction products of the inventive anaerobic curable compositions.

The present invention will be more fully appreciated by a reading of the "Detailed Description of the Invention", and the illustrative examples which follow thereafter.

DETAILED DESCRIPTION OF THE INVENTION

Figure 1:
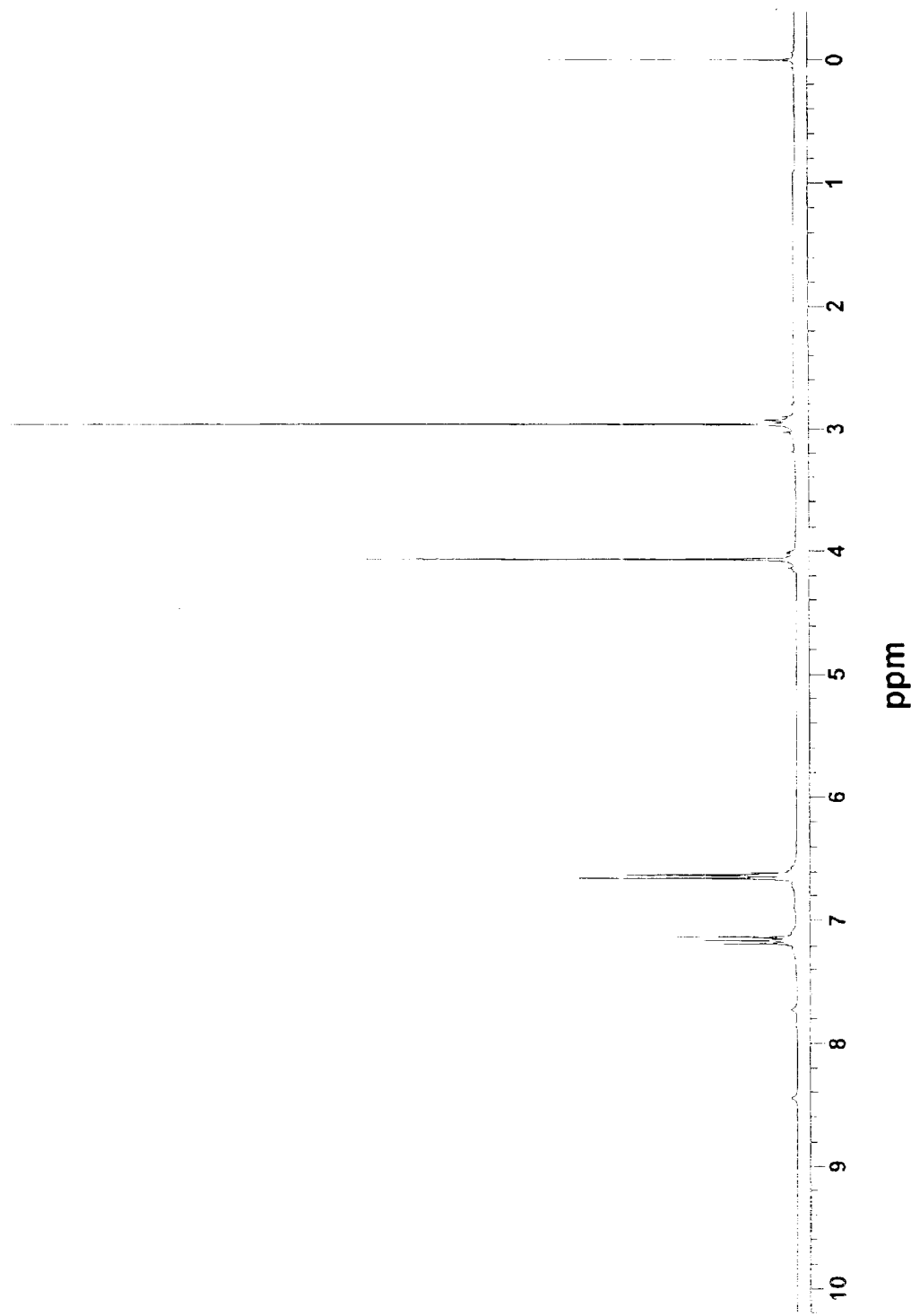
FIG. 1 depicts a $^1$H NMR spectra of NPG and N-Me-NPG.
Figure 2:
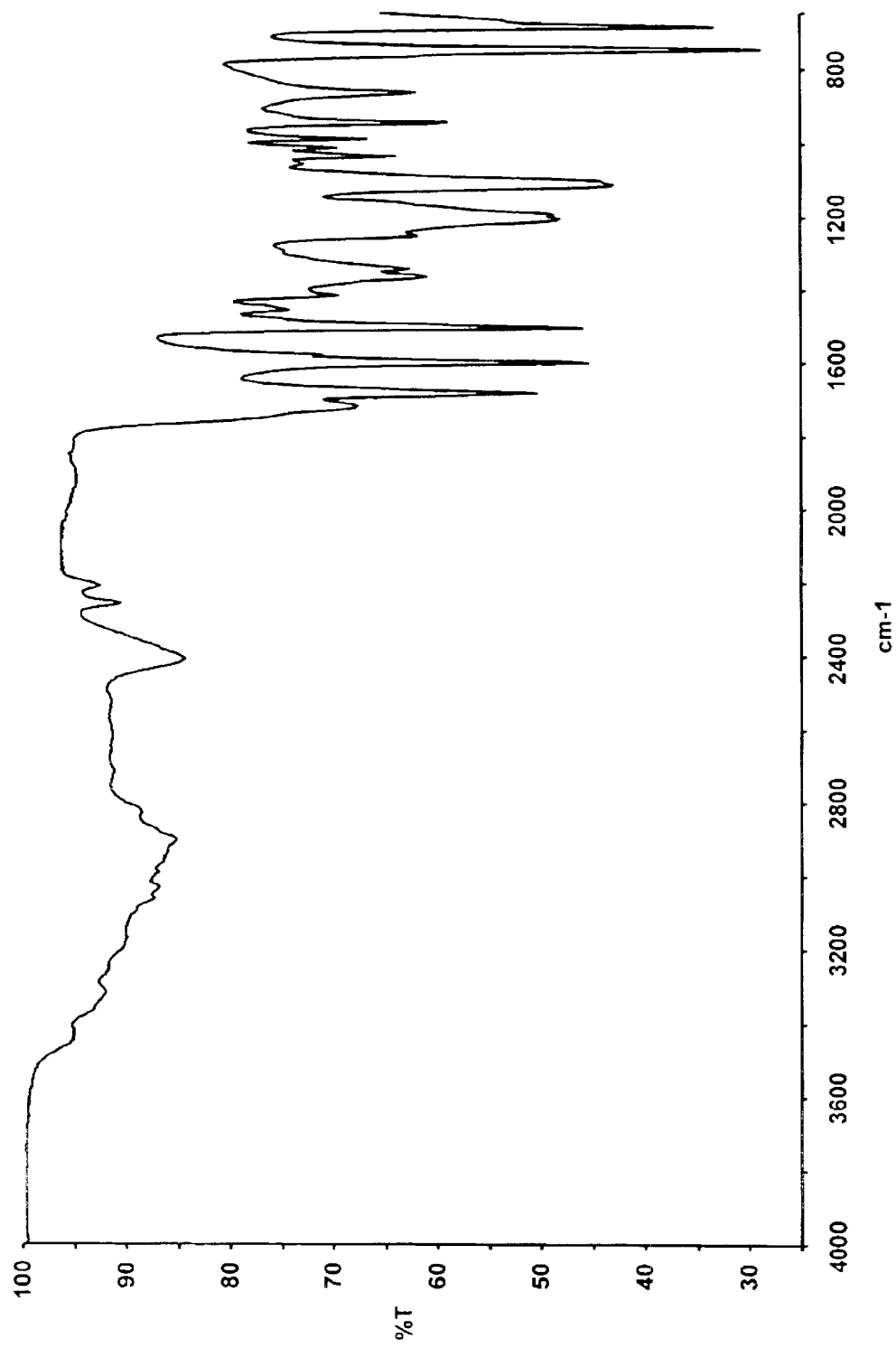
FIG. 2 depicts an IR spectra of NPG and N-Me-NPG.
Figure 3:
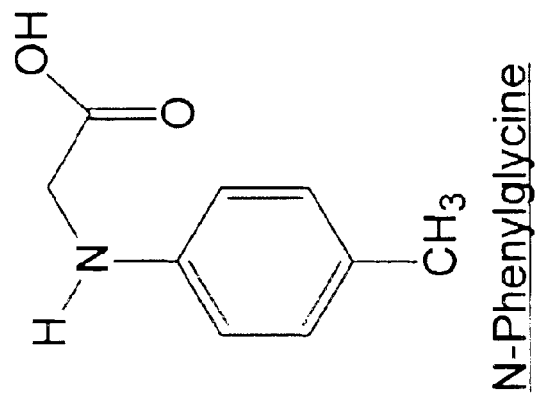
FIG. 3 depicts a synthetic scheme to arrive at N-Me-NPG.
Figure 3:
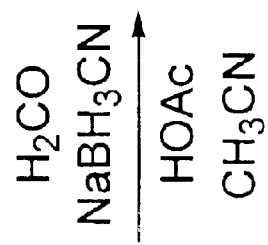
Figure 3:
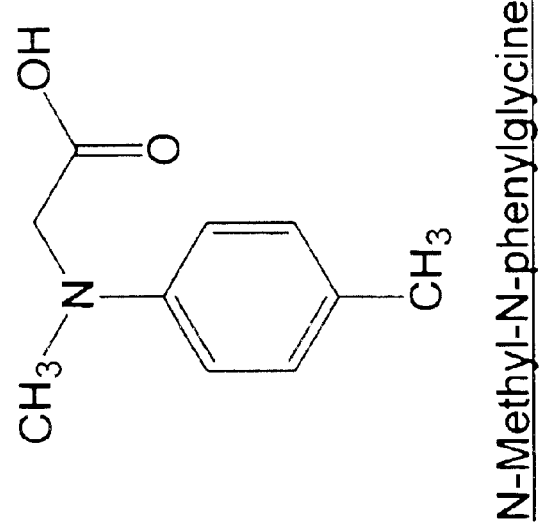

The present invention provides anaerobic cure accelerators, which are generally sulfinimides and oxygen and sulfur derivatives thereof, sulfonimides and oxygen and sulfur derivatives thereof, sulfonamides and oxygen and sulfur derivatives thereof, and the oxygen and sulfur analogues of sulfimides. The addition of such compounds as cure accelerators into anaerobic curable compositions as a replacement for some or all of the amount of conventional cure accelerators, namely saccharin, surprisingly provides at least comparable cure speeds and physical properties for the reaction products formed.

The inventive anaerobic cure accelerators may be represented below within structure I:

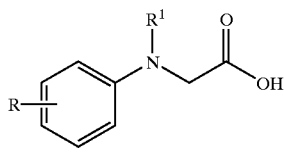

where R is hydrogen, halogen, alkyl, alkenyl, hydroxyalkyl, hydroxyalkenyl, carboxyl, or sulfonato, and $R^1$ is hydrogen, alkyl, alkenyl, hydroxyalkyl, hydroxyalkenyl, or aralkyl.

Desirably, R is hydrogen and $R^1$ is hydrogen or alkyl, such as methyl. A particular example of such accelerators includes N-phenyl glycine.

The inventive cure accelerators are useful in, or as primers for use with, anaerobic curable compositions as a replacement for some of or all of the typically used accelerator(s). These phenyl glycines and derivatives thereof display good solubility, stability and anaerobic activity in anaerobic curable compositions.

Anaerobic curable compositions generally are based on a (meth)acrylate component, together with an anaerobic cure-inducing composition. In the present invention, such anaerobic curable compositions are desirably substantially free of saccharin and include the inventive cure accelerators within structure I.

(Meth)acrylate monomers suitable for use as the (meth)acrylate component in the present invention may be chosen from a wide variety of materials, such as these represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as, but not limited to, di-or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol)dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

Recently, additional components have been included in traditional anaerobic curable compositions to alter the physical properties of either the curable compositions or the reaction products thereof.

For instance, one or more of maleimide components, thermal resistance-conferring coreactants, diluent components reactive at elevated temperature conditions, mono- or poly-hydroxyalkanes, polymeric plasticizers, and chelators (see International Patent Application No. PCT/US98/13704, the disclosure of which is hereby expressly incorporated herein by reference) may be included to modify the physical property and/or cure profile of the formulation and/or the strength or temperature resistance of the cured adhesive.

When used, the maleimide, coreactant, reactive diluent, plasticizer, and/or mono- or poly-hydroxyalkanes, may be present in an amount within the range of about 1 percent to about 30 percent by weight, based on the total weight of the composition.

The inventive compositions may also include other conventional components, such as free radical initiators, other free radical co-accelerators, inhibitors of free radical generation, as well as metal catalysts, such as iron and copper.

A number of well-known initiators of free radical polymerization are typically incorporated into the inventive compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

Conventional co-accelerators of free radical polymerization may also be used in conjunction with the inventive anaerobic cure accelerators. Such co-accelerators are typically of the hydrazine variety (e.g., APH), as disclosed in the '330 and '349 patents.

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelators may ordinarily be present in the compositions in an amount from about 0.001 percent by weight to about 0.1 percent by weight, based on the total weight of the composition.

The inventive anaerobic cure accelerators may be used in amounts of about 0.1 to about 5 percent by weight, such as about 1 to about 2 percent by weight, based on the total weight of the composition. When used in combination with conventional accelerators (though at lower levels, for such conventional accelerators), the inventive accelerators should be used in amounts of about 0.01 to about 5 percent by weight, such as about 0.02 to about 2 percent by weight.

Metal catalyst solutions or pre-mixes thereof are used in amounts of about 0.03 to about 0.1 percent by weight. Other agents such as thickeners, non-reactive plasticizers, fillers, toughening components (such as elastomers and rubbers), and other well-known additives may be incorporated therein where the art-skilled believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, glass and other metals and alloys, ceramics and thermosets. The compositions of this invention demonstrate particularly good bond strength on steel, glass and aluminum. An appropriate primer may be applied to a surface of the chosen substrate to enhance cure rate. Or, the inventive anaerobic cure accelerator may be used as a primer itself. See e.g. U.S. Pat. No. 5,811,473 (Ramos).

In addition, this invention provides a method of preparing an anaerobic curable composition, a step of which includes mixing together a (meth)acrylate component and an anaerobic cure-inducing composition, desirably substantially free of saccharin, including the inventive anaerobic cure accelerator within structure I.

The invention also provides a process for preparing a reaction product from the anaerobic adhesive composition of the present invention, the steps of which include applying the composition to a desired substrate surface and exposing the composition to an anaerobic environment for a time sufficient to cure the composition.

This invention also provides a method of using as a cure accelerator for anaerobic curable compositions compounds within structure I.

And the present invention provides a method of using an anaerobic cure accelerator within structure I as a replacement for some or all of the typical accelerator used in anaerobic curable compositions. Of the course, the present invention also provides for a bond formed between two mated substrates with the inventive composition.

In view of the above description of the present invention, it is clear that a wide range of practical opportunities is provided. The following examples are provided for illustrative purposes only, and are not to be construed so as to limit in any way the teaching herein.

EXAMPLES

An investigation was performed to evaluate certain phenyl glycines, as a replacement for some or all of saccharin in anaerobic curable compositions.

These new cure systems were compared with control formulations containing the conventional cure components, APH and saccharin by 82° C. accelerated stability, fixture time, and one hour/24 hour adhesion tests on nut/bolt specimens.

N-Phenyl glycine ("NPG") was used for evaluation to determine their suitability as cure accelerators in the anaerobic adhesives.

A. Synthesis

To a 500 mL four-neck reaction flask cooled at 0° C. with an ice bath, equipped with a nitrogen inlet, mechanical stirrer, heating mantle, pH meter, condenser, and thermocouple temperature controller, was added NPG (5 g, 33 mmol), 37 wt. % aq. formaldehyde (8.1 g, 20 mL, 269 mmol), sodium cyano borohydride (6.8 g, 108 mmol), and acetonitrile (100 mL). Acetic acid (2 mL) was added with stirring and the mixture was allowed to cool to ambient temperature, with stirring continued overnight. Volatiles were removed under reduced pressure, and methylene chloride (50 mL) and 10 wt. % aq. hydrocloric acid (50 mL) added to the residue, and the organic layer allowed to separate. The aqueous layer was washed twice with 50 mL of methylene chloride, and the organic layers combined. The organic layers were dried over anhydrous magnesium sulfate, filtered and the solvent removed under reduced pressure to yield 5.4 grams of crude product. Crude N-Me-NPG was purified first using chromatography with silica gel as the stationary phase and ethyl acetate as the eluant. The N-Me-NPG was further purified using an acid-base extraction to yield 2.8 grams of relatively pure N-Me-NPG in a 52% yield.

B. Adhesive Formulations

Sample Nos. 1–4 were prepared from the noted components in the listed amounts, by mixing with a mechanical stirrer in glass vials. Each sample included a chelator and naphthaquinone as stabilizers.

TABLE 1

| COMPONENTS | | Sample No./(Amt./wt %) | | | |
|---|---|---|---|---|---|
| Type | Identity | 1 | 2 | 3 | 4 |
| (Meth)acrylate | PEGMA | 79.8 | 79.8 | 63.2 | 63.2 |
| Bismaleimide | N,N'-m-phenylene-bismaleimide | 14.7 | 14.7 | — | — |
| Plasticizer | PEG 200 MO | — | — | 26.3 | 26.3 |
| Toluidines | DE-p-T | 0.4 | 0.7 | 0.8 | — |
| | DM-o-T | 0.4 | — | — | — |
| Peroxide | CHP | 2.4 | 2.4 | 1.8 | 1.8 |
| Conventional Accelerator | APH | 0.2 | 0.2 | — | — |
| Conventional Co-accelerator | Saccharin | 0.3 | 0.3 | 3.8 | 3.8 |
| Inventive Accelerator | NPG | — | 0.8 | — | 0.8 |
| Additives | Stabilizers | 0.4 | 0.4 | 2.3 | 2.3 |
| | Silica | 1.1 | 1.1 | 1.8 | 1.8 |
| | Maleic Acid | 0.3 | 0.3 | — | — |

C. Physical Properties

Shelf Life Stability

The 82° C. stability of the formulations was determined according to an evaluation in which the formulation is judged to have acceptable shelf stability if the adhesive formulation remains liquid for 3.5 hours or longer at 82° C.

The formulations demonstrated acceptable shelf life stability.

Fixture Times

Two drops of each sample were applied to the threads of a degreased ⅜×16 mild steel bolt, and a mild steel nut was assembled onto the bolt. Five nut and bolt specimens were assembled for each sample. The time required for the sample to cure sufficiently to enable the assembled specimen to resist loosening by turning with the fingers was then recorded. The average fixture time of the five specimens was calculated and recorded as the fixture time for that sample.

Fixture times of the samples set forth in Table 1 on steel, stainless steel, zinc and cadmium nut/bolt specimens are reported below in Table 2.

One-Hour and 24-Hour Break and Prevail Strengths

For the break/prevail adhesion tests, the specimens were maintained at ambient temperature for 1 hour and 24 hours after assembly and were tested as follows.

The break and prevail torque strengths were observed and recorded for half of the specimens after one hour at ambient temperature and after 24 hours at ambient temperature for the remaining specimens. The torque strengths were measured on a calibrated automatic torque analyzer.

The data for these evaluations is set forth below in Table 2.

The one-hour and 24-hour break and prevail strengths of the sample of the inventive composition were lower than the control sample, but still demonstrated conductive adhsive strength. More specifically, these data indicate that the phenyl glycine anaerobic cure accelerators in accordance with this invention functioned in anaerobic (meth)acrylate-based adhesives at room temperature like traditional anaerobic (meth)acrylate-based adhesives when applied and cured on the substrates.

TABLE 2

| Physical Property | Sample No./Substrate | | | | | | | | | |
|---|---|---|---|---|---|---|---|---|---|---|
| | 1 | 2 | 3 | 4 | 3 | 4 | 3 | 4 | 3 | 4 |
| | Mild Steel | | Mild Steel | | Stainless Steel | | Zinc | | Cadmium | |
| Fixture Time (min.) | >10 <11 | >50 <60 | >14 <20 | >16 <20 | >105 | >42 <54 | >12 <15 | >20 <26 | >105 | >54 <63 |
| Break Strength 1 hr. (in.lbs.) | 57 | 6 | 64 | 34 | 8 | 11 | 40 | 30 | 6 | 10 |
| Break Strength 24 hrs. (in.lbs.) | 166 | 168 | 132 | 146 | 27 | 65 | 123 | 134 | 58 | 62 |
| Prevail Strength 1 hr. (in.lbs.) | 6 | 9 | 17 | 10 | 4 | 2 | 11 | 4 | 2 | 3 |
| Prevail Strength 24 hrs. (in.lbs.) | 204 | 139 | 38 | 51 | 3 | 16 | 27 | 24 | 24 | 21 |

These phenyl glycines are useful in anaerobic curable compositions as a replacement for some of or all of the saccharin and/or aromatic amine typically used as an accelerator combination.

What is claimed is:

1. An anaerobic curable composition, comprising:
   (a) a (meth)acrylate component;
   (b) an anaerobic cure-inducing composition substantially free of saccharin; and
   (c) an anaerobic cure accelerator compound within structure I

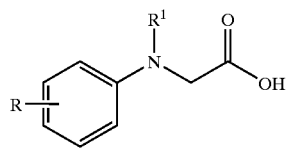

wherein R is a member selected from the group consisting of hydrogen, halogen, alkyl, alkenyl, hydroxyalkyl, hydroxyalkenyl, carboxyl, and sulfonato, and $R^1$ is a member selected from the group consisting of hydrogen, alkyl, alkenyl, hydroxyalkyl, hydroxyalkenyl, and aralkyl.

2. The composition according to claim 1, wherein the (meth)acrylate component is represented by $H_2C=CGCO_2R^1$, wherein G is a member selected from the group consisting of H, halogen and alkyl having from 1 to about four carbon atoms, and $R^1$ is a member selected from the group consisting of alkyl, cycloalkyl, aklenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulonate and sulfone.

3. The composition according to claim 1, wherein the (meth)acrylate component is a member selected from the group consisting of silicone (meth)acrylates, polyethylene glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, tetrahydrofuran (meth)acrylates and di(meth)acrylates, hydroxypropyl (meth)acrylate, hexanediol di(meth)acrylate, and trimethylol propane tri(meth)acrylate.

4. The composition according to claim 1, wherein the anaerobic cure accelerator is a member selected from the group consisting of N-phenyl glycine, N-methyl-N-phenylglycine, and combinations thereof.

5. The composition according to claim 1, further comprising an additional accelerator.

6. The composition according to claim 1, further comprising a peroxide compound.

7. The composition according to claim 1, wherein the additional accelerator is saccharin.

8. Reaction products of the composition according to claim 1.

9. A process for preparing a reaction product from an anaerobic curable composition, comprising the steps of:
   apply an anaerobic curable composition according to claim 1, to a desired substrate surface and
   exposing the composition to an anaerobic environment for a time sufficient to cure the composition.

10. A method of preparing an anaerobic curable composition, comprising the step of:
    mixing together:
    a (meth)acrylate component,
    an anaerobic cure inducing composition and
    an anaerobic cure accelerator compound in accordance with claim 1.

11. The composition according to claim 1, wherein the anaerobic cure-inducing composition comprises the combination of a free radical initiator and a free radical co-accelerator.

12. A method of using an anaerobic cure accelerator compound in accordance with claim 1, comprising either:
(I) mixing the anaerobic cure accelerator compound in an anaerobic curable composition; or
(II) applying onto a surface of a substrate the anaerobic cure accelerator compound and applying thereover an anaerobic curable composition.

13. An anaerobic curable composition, consisting essentially of:

(a) a (meth)acrylate component;
(b) an anaerobic cure-inducing composition; and
(c) an anaerobic cure accelerator compound in accordance with claim 1; and
(d) optionally, one or more additives selected from the group consisting of free radical initiators, free radical co-accelerators, free radical inhibitors, metal catalysts, thickneners, non-reactive plasticizers, fillers, and toughening agents.

14. A composition comprising a bond formed between two mated substrates with the composition of claim 1.

* * * * *